United States Patent
Jun

(10) Patent No.: US 11,592,728 B2
(45) Date of Patent: Feb. 28, 2023

(54) CAMERA MODULE

(71) Applicant: SAMSUNG ELECTRO-MECHANICS CO., LTD., Suwon-si (KR)

(72) Inventor: Jae Woo Jun, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 17/462,891

(22) Filed: Aug. 31, 2021

(65) Prior Publication Data
US 2022/0163873 A1 May 26, 2022

(30) Foreign Application Priority Data

Nov. 24, 2020 (KR) .................. 10-2020-0158434

(51) Int. Cl.
| G03B 17/56 | (2021.01) |
| G03B 5/00 | (2021.01) |
| H04N 23/68 | (2023.01) |
| G03B 30/00 | (2021.01) |

(52) U.S. Cl.
CPC .......... *G03B 17/561* (2013.01); *G03B 5/00* (2013.01); *G03B 30/00* (2021.01); *G03B 2205/0076* (2013.01); *H04N 23/687* (2023.01)

(58) Field of Classification Search
CPC .... G03B 2205/0076; G03B 5/00; G03B 5/02; G03B 5/06; F03G 7/065; H04N 23/387
See application file for complete search history.

(56) References Cited

U.S. PATENT DOCUMENTS

| 2004/0212702 A1 | 10/2004 | Suh |
| 2017/0171440 A1* | 6/2017 | Park .................. H04N 5/23287 |
| 2019/0020799 A1 | 1/2019 | Minamisawa et al. |
| 2020/0012169 A1* | 1/2020 | Lee ........................ G03B 13/36 |
| 2020/0120238 A1* | 4/2020 | Kim ........................ G03B 5/02 |

FOREIGN PATENT DOCUMENTS

| GB | 2579096 A * | 6/2020 | ............... F03G 7/06 |
| GB | 2598091 A * | 2/2022 | ............ F03G 7/065 |
| KR | 10-2004-0093251 A | 11/2004 | |
| KR | 10-2017-0070625 A | 6/2017 | |
| KR | 10-2019-0007378 A | 1/2019 | |
| KR | 10-2106525 B1 | 5/2020 | |

OTHER PUBLICATIONS

Korean Office Action dated Apr. 8, 2022, in counterpart Korean Patent Application No. 10-2020-0158434 (6 pages in English and 5 pages in Korean).

* cited by examiner

*Primary Examiner* — Christopher E Mahoney
(74) *Attorney, Agent, or Firm* — NSIP Law

(57) ABSTRACT

A camera module includes: a first driving unit including a rotating plate disposed in a housing so as to be rotatable about an optical axis, and a first shape memory alloy (SMA) wire configured to rotate the rotating plate in response to a first applied current; and an optical module disposed in the housing and coupled to the rotating plate.

20 Claims, 9 Drawing Sheets

CAMERA MODULE

CROSS-REFERENCE TO RELATED APPLICATIONS

This application claims the benefit under 35 U.S.C. § 119(a) of Korean Patent Application No. 10-2020-0158434 filed on Nov. 24, 2020 in the Korean Intellectual Property Office, the entire disclosure of which is incorporated herein by reference for all purposes.

BACKGROUND

1. Field

The following description relates to a camera module and, for example, a camera actuator and a camera module configured to generate driving force using characteristics of a shape memory alloy (SMA) returned to its original shape when heated.

2. Description of Related Art

Camera modules provided in mobile devices are manufactured to have a degree of performance comparable to that of conventional cameras. In particular, as the frequency of capturing images using mobile devices has increased, demand for a camera module capable of providing high zoom magnification has increased.

In the related art, a voice coil motor including a combination of a magnet and a coil is used as a driving unit for rotating a camera module. However, there may be a problem in that a magnetic field due to the coil or the magnet may negatively affect performance of a nearby electronic component. This problem may be solved by using a separate shielding structure or rearranging a driving unit, which, however, may lead to a problem that a structure becomes more complicated.

An SMA material may be arranged to drive motion of a camera lens element upon heating of the SMA. An operation may be achieved by controlling a temperature of the SMA material over an active temperature range in which the SMA material changes between martensitic and austenitic phases in which stress and strain of the SMA material change. At low temperatures, the SMA material is in the martensitic phase, whereas, at high temperatures, the SMA material transforms into the austenite phase which induces deformation to result in shrinkage of the SMA material. A temperature of the SMA material may be changed by causing an electric current to pass through the SMA material to heat the SMA material to cause a phase change, and the SMA material is arranged to cause a deformation to drive a motion of an object. The use of the SMA material as actuators for small objects, such as camera lens elements of small cameras, provides essentially linear driving force, provides higher power per unit mass, is inexpensive, and is a relatively small component.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes: a first driving unit including a rotating plate disposed in a housing so as to be rotatable about an optical axis, and a first shape memory alloy (SMA) wire configured to rotate the rotating plate in response to a first applied current; and an optical module disposed in the housing and coupled to the rotating plate.

The first SMA wire may have one end interlocking with the rotating plate and another end fixedly coupled to the housing. The rotating plate may be configured to rotate in either one of a clockwise direction and a counterclockwise direction about the optical axis, according to a change in length of the first SMA wire.

The first driving unit may further include a second SMA wire configured to change in length, in a direction opposite to a direction of the change in length of the first SMA wire, in response to the first applied current, and having one end interlocking with the rotating plate and another end fixedly coupled to the housing.

The camera module may further include: a rotary arm rotatably disposed in the housing and interlocking with the rotating plate. The one end of the first SMA wire may be connected to the rotary arm and the other end of the first SMA wire may be connected to the housing.

The rotating plate may include a protrusion extending in a radial direction, and the rotary arm and the rotating plate may interlock with each other by the protrusion being accommodated in an accommodating portion disposed in the rotary arm.

The rotating plate and the rotary arm may interlock with each other by a meshing engagement.

The housing may have a quadrangular ring shape having four corners. The rotary arm may be rotatably disposed in a first corner of the housing. The one end of the first SMA wire may be fixedly coupled to the rotary arm and the other end of the first SMA wire may be fixedly coupled to a second corner of the housing adjacent to the first corner.

The camera module may further include a substrate electrically connected to two ends of the first SMA wire such that current is allowed to flow through the first SMA wire.

The first driving unit may further include a first conductive member fixedly coupled to the optical module and a second conductive member fixedly coupled to the housing. The two ends of the first SMA wire may be coupled to the first conductive member and the second conductive member. The substrate may be configured to apply a voltage between the first conductive member and the second conductive member.

The camera module may further include a second driving unit configured to rotate the optical module about a first axis perpendicular to the optical axis. The second driving unit may include a third SMA wire configured to change in length in response to a second applied current.

The second driving unit may further include a first frame accommodating the optical module and a second frame accommodating the first frame. One end of the third SMA wire may be fixedly coupled to the first frame and another end of the third SMA wire may be fixedly coupled to the second frame. The first frame may be configured to rotate about the first axis with respect to the second frame, according to a change in length of the third SMA wire.

The second driving unit may further include a fourth SMA wire configured to change in length, in a direction opposite to a direction of the change in length of the third SMA wire, in response to the second applied current, and having one end fixedly coupled to the first frame and another end fixedly coupled to the second frame.

The camera module may further include a third driving unit configured to rotate the optical module about a second axis perpendicular to the optical axis and intersecting the first axis. The third driving unit may include a fifth SMA wire configured to change in length in response to a third applied current.

The third driving unit may further include a second frame accommodating the optical module and a third frame accommodating the second frame. One end of the fifth SMA wire may be fixedly coupled to the second frame and another end of the fifth SMA wire may be fixedly coupled to the third frame. The second frame may be configured to rotate about the second axis with respect to the third frame, according to a change in length of the fifth SMA wire.

The third driving unit may further include a sixth SMA wire configured to change in length, in a direction opposite to a direction of the change in length of the fifth SMA wire, in response to the third applied current, and having one end fixedly coupled to the second frame and another end fixedly coupled to the third frame.

In another general aspect, a camera module includes: an optical module disposed in the housing; and a driving unit configured to rotate the optical module about an optical axis and an axis perpendicular to the optical axis. The driving unit may include an actuator including at least one shape memory alloy (SMA) wire configured to change in length in response to applied current.

The at least one SMA wire may include two SMA wires configured change in length in response to the applied current to cause the optical module to rotate about the axis perpendicular to the optical axis. One of the two SMA wires may be configured to shorten when the other of the two SMA wires lengthens.

Each of the two SMA wires may have one end connected to a first frame to which the optical module is rotatably mounted, and another end connected to a second frame to which the first frame is rotatably mounted.

The one end of each of the two SMA wires may be connected to the first frame through one conductive member configured to receive the applied current, and the other end of each of the SMA wires may be connected to the second frame through another conductive member configured to receive the applied current.

The at least one SMA wire may include two SMA wires configured change in length in response to the applied current to cause the optical module to rotate about the optical axis. One of the two SMA wires may be configured to shorten when the other of the two SMA wires lengthens.

Each of the two SMA wires may have one end connected to the housing, and another end connected to a plate rotatably supporting the optical module.

The one end of each of the two SMA wires may be connected to the housing through one conductive member configured to receive the applied current, and the other end of each of the SMA wires may be connected to the plate through another conductive member configured to receive the applied current.

Other features and aspects will be apparent from the following detailed description, the drawings, and the claims.

Figure 1:
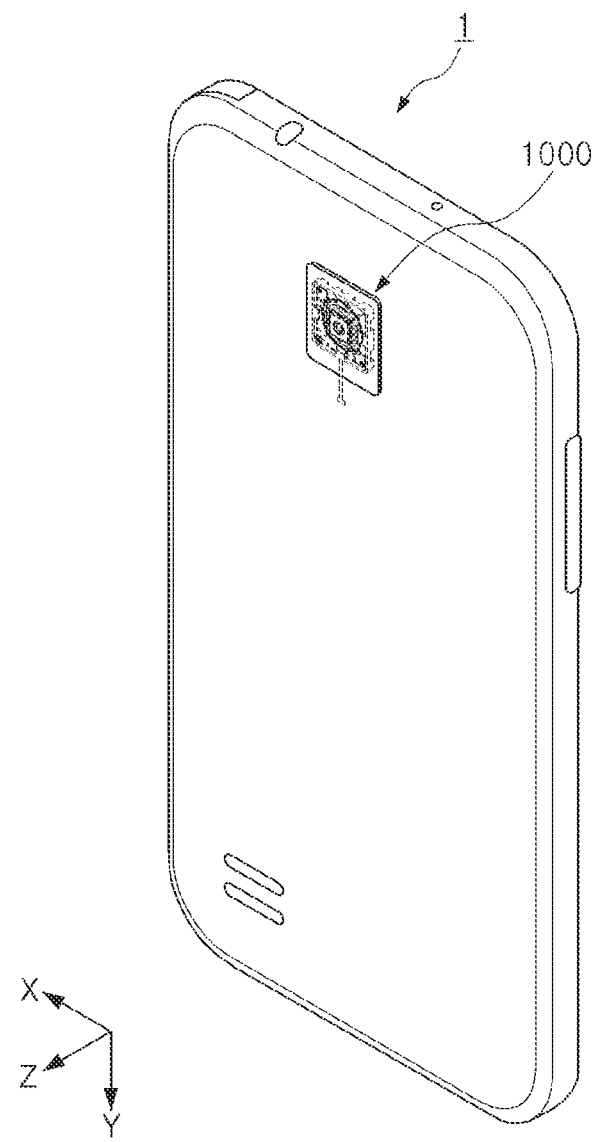
FIG. 1 illustrates an electronic device including a camera module, according to an embodiment.

Throughout the drawings and the detailed description, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is to be noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

The features of the examples described herein may be combined in various ways as will be apparent after an understanding of this disclosure. Further, although the examples described herein have a variety of configurations, other configurations are possible as will be apparent after an understanding of this disclosure.

FIG. 1 illustrates an electronic device 1 having a camera module 1000, according to an embodiment.

The camera module 1000 may be provided in the electronic device 1, and is configured to image an external subject. In the illustrated embodiment, the camera module 1000 is disposed such that an angle of view of the camera module 1000 faces the rear of the electronic device 1. However, this configuration of the camera module 1000 is only an example, and, in another embodiment, the camera module 1000 may be disposed such that the angle of view faces the side or the front.

When the user directly holds the electronic device 1 and images a subject, an image may be shaken. In particular, when a user images a subject while walking or running, the subject may fluctuate severely within an image frame, and, thus, it may be difficult to accurately record a movement or appearance of the subject as an image.

An optical module in which a lens and an image sensor are integrally provided in the camera module 1000 may rotate in several directions to capture a stable image. In this disclosure, an optical module may be understood as a structure including at least one lens and an image sensor.

In an embodiment, the camera module 1000 may include a 3-axis gimbal function. For example, the optical module may rotate with respect to (e.g., "around") an optical axis and two axes perpendicular to the optical axis and intersecting each other. For example, the optical module may rotate with respect to three axes parallel to the Z-axis, the X-axis, or the Y-axis.

As a number of driving directions of the optical module increases, a driving unit becomes more complicated and larger. Thus, an element for implementing a compact driving unit for the optical module is required. In particular, since a voice coil motor (VCM) actuator widely used as a driving unit of a camera module of the related art uses a magnet and a coil, electromagnetic interference with neighboring electronic components may occur. In an embodiment, a driving unit (or actuator) capable of avoiding electromagnetic interference with surrounding electronic components, while being compact, may be provided.

Figure 2:
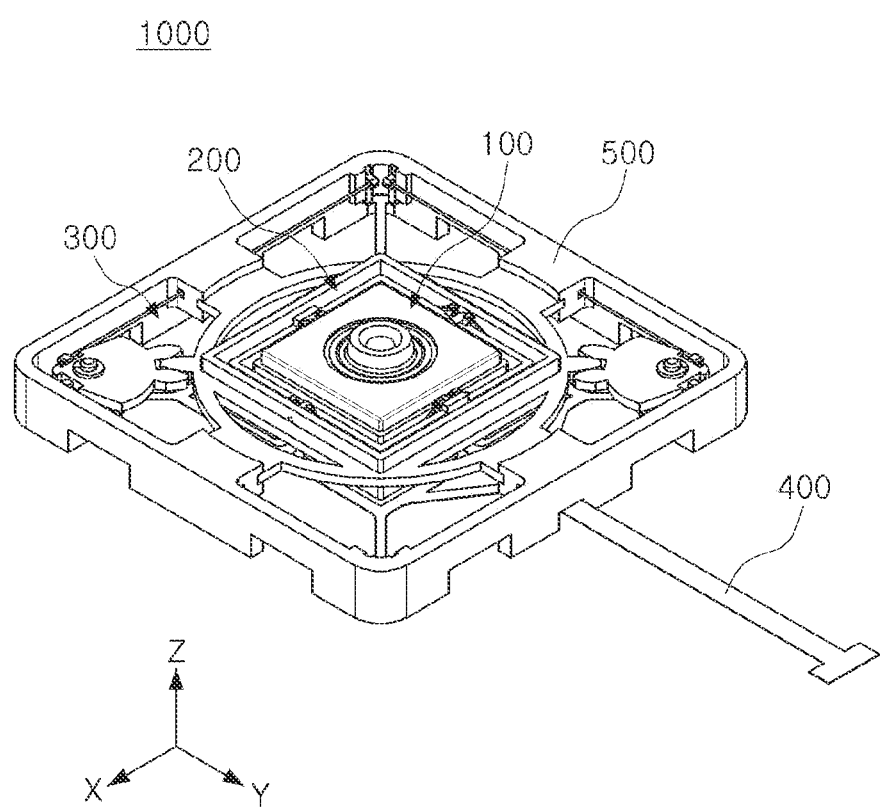
FIG. 2 is a perspective view of the camera module of FIG. 1, according to an embodiment.
Figure 3:
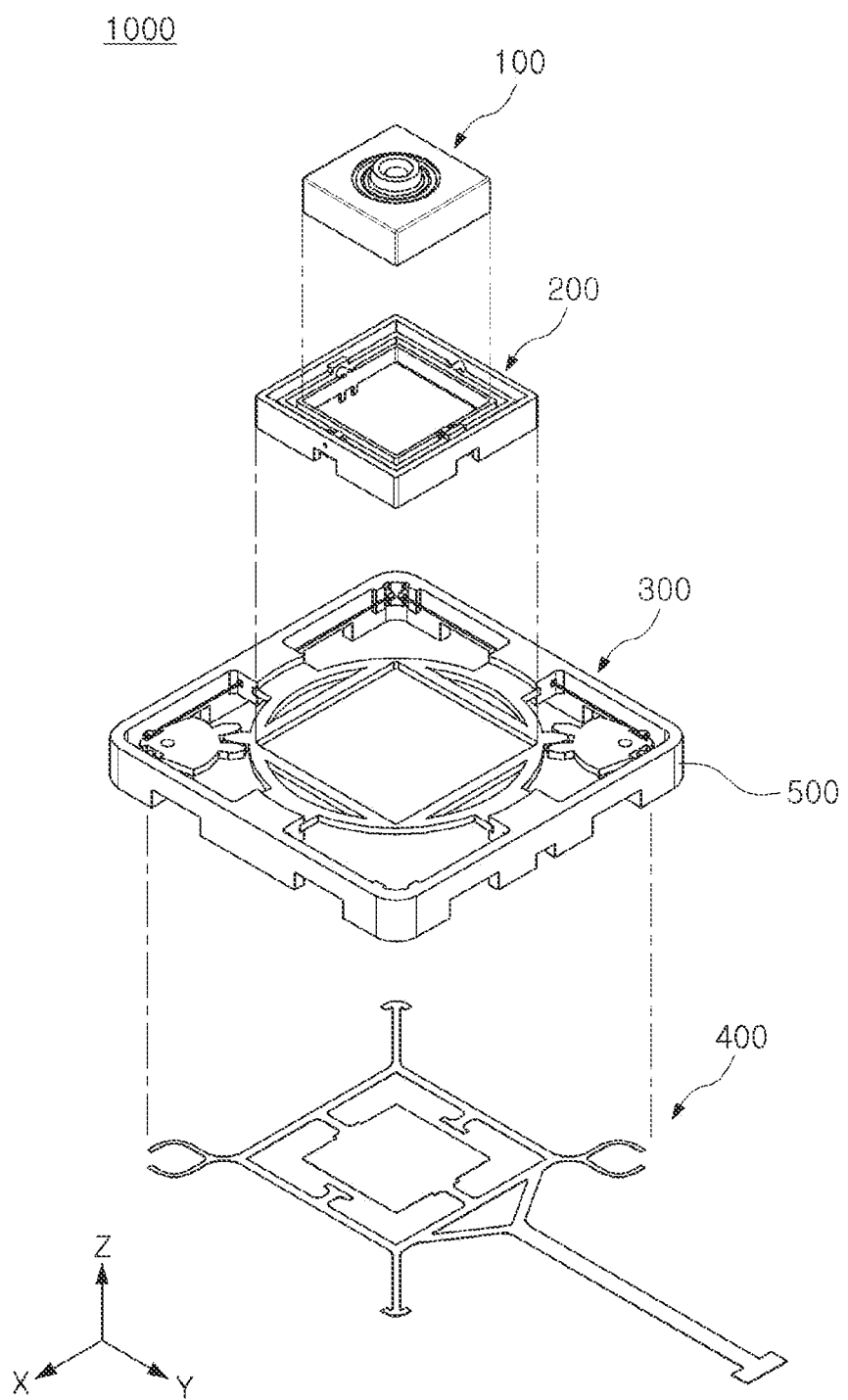
FIG. 3 is an exploded perspective view of the camera module of FIG. 1, according to an embodiment.

FIG. 2 is a perspective view of the camera module 1000, according to an embodiment. FIG. 3 is an exploded perspective view of the camera module 1000, according to an embodiment.

Referring to FIGS. 2 and 3, the camera module 1000 may include an optical module 100 disposed in a housing 500, and driving units 200 and 300 configured to drive the optical module 100.

The optical module 100 may include at least one lens and an image sensor aligned with the at least one lens. The at least one lens and the image sensor are arranged along the optical axis.

In an embodiment, the at least one lens does not move in a direction perpendicular to the optical axis with respect to the image sensor. In an embodiment, a distance between the at least one lens and the image sensor in the optical axis direction may be changed. Although not shown, a focal length may be automatically adjusted (i.e., autofocusing) by adjusting the distance between the at least one lens and the image sensor.

In an embodiment, the optical module 100 may rotate with respect to the housing 500 based on a plurality of axes. In this disclosure, rotation of the optical module 100 is rotation with respect to the housing 500, unless otherwise specified.

In an embodiment, the optical module 100 may rotate with relative to the housing 500, with respect to three axes. For example, the optical module 100 may rotate with respect to the optical axis and two axes perpendicular to the optical axis. The rotation of the optical module 100 with respect to the optical axis may be referred to as roll of the optical module 100. In addition, rotation of the optical module 100 with respect to an axis perpendicular to the optical axis may be referred to as pitch or yaw of the optical module 100.

In this disclosure, the optical axis may be parallel to the Z-axis, and rotation with on the optical axis may be understood to have the same meaning as rotation with respect to the Z-axis. Also, an axis perpendicular to the optical axis may be understood as the X-axis and/or the Y-axis. That is, rotation with respect to the X-axis or Y-axis may be understood as rotation with respect to an axis perpendicular to the optical axis.

In an embodiment, the camera module 1000 may include the driving units 200 and 300 configured to rotate the optical module 100. In an embodiment, the driving unit may include three driving units according to rotation directions. In an embodiment, the driving units 200 and 300 may be a first driving unit 200 configured to rotate the optical module 100 with respect to an axis perpendicular to the optical axis, and the driving unit 300 may be a second driving unit 300 configured to rotate the optical module 100 with respect to the optical axis. The first driving unit 200 may include an X-driving unit configured to rotate the optical module 100 with respect to the X-axis, and a Y-driving unit configured to rotate the optical module 100 with respect to the Y-axis.

In an embodiment, the first and second driving units 200 and 300 may include a mechanism by which the optical module 100 may rotate with respect to the housing 500, and an actuator for driving the mechanism. In an embodiment, the first and second driving units 200 and 300 may include a shape memory alloy (SMA) wire as an actuator. The SMA wire is a member in the form of a wire formed of a shape memory alloy, and has a characteristic that a length of the SMA wire is changed by a current flowing therein. Even if the SMA wire is stretched beyond its initial length, the SMA wire may return to its original length when heated. The SMA wire may be heated by applying a current to the SMA wire. That is, by applying a voltage to both ends of the SMA wire, it the length of the SMA wire may be increased or decreased. In this disclosure, heating the SMA wire may be understood as allowing a current to flow to the SMA wire or applying a voltage to the SMA wire.

Figure 4:
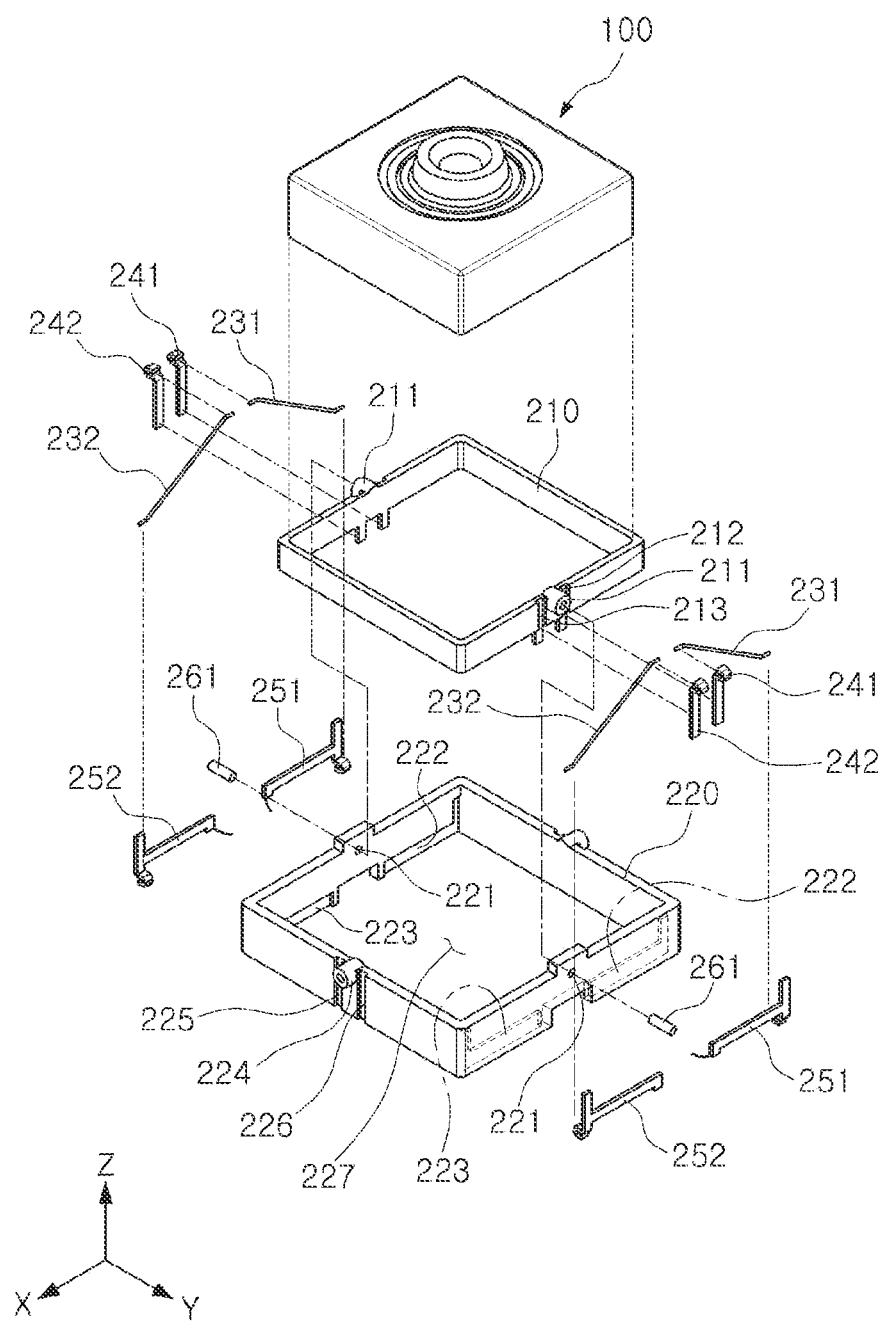
FIG. 4 is an exploded perspective view of a driving unit configured to rotate an optical module around a Y-axis, according to an embodiment.

For example, referring to FIG. 4, the Y-driving unit may include a first frame 210, a second frame 220, and a pin rotatably connecting the first frame 210 to the second frame 220 as a mechanism, and may include first and second SMA wires 231 and 232 enabling the mechanism to operate as an actuator.

In an embodiment, the camera module 1000 may include a substrate 400 (see FIG. 3), and the Y-driving unit may be electrically connected to the substrate 400. The Y-driving unit may rotate the optical module 100 by power supplied from the substrate. For example, both ends of the first and second SMA wires 231 and 232 may be directly or indirectly connected to the substrate so that a current may flow through the first and second SMA wires 231 and 232.

Figure 5:
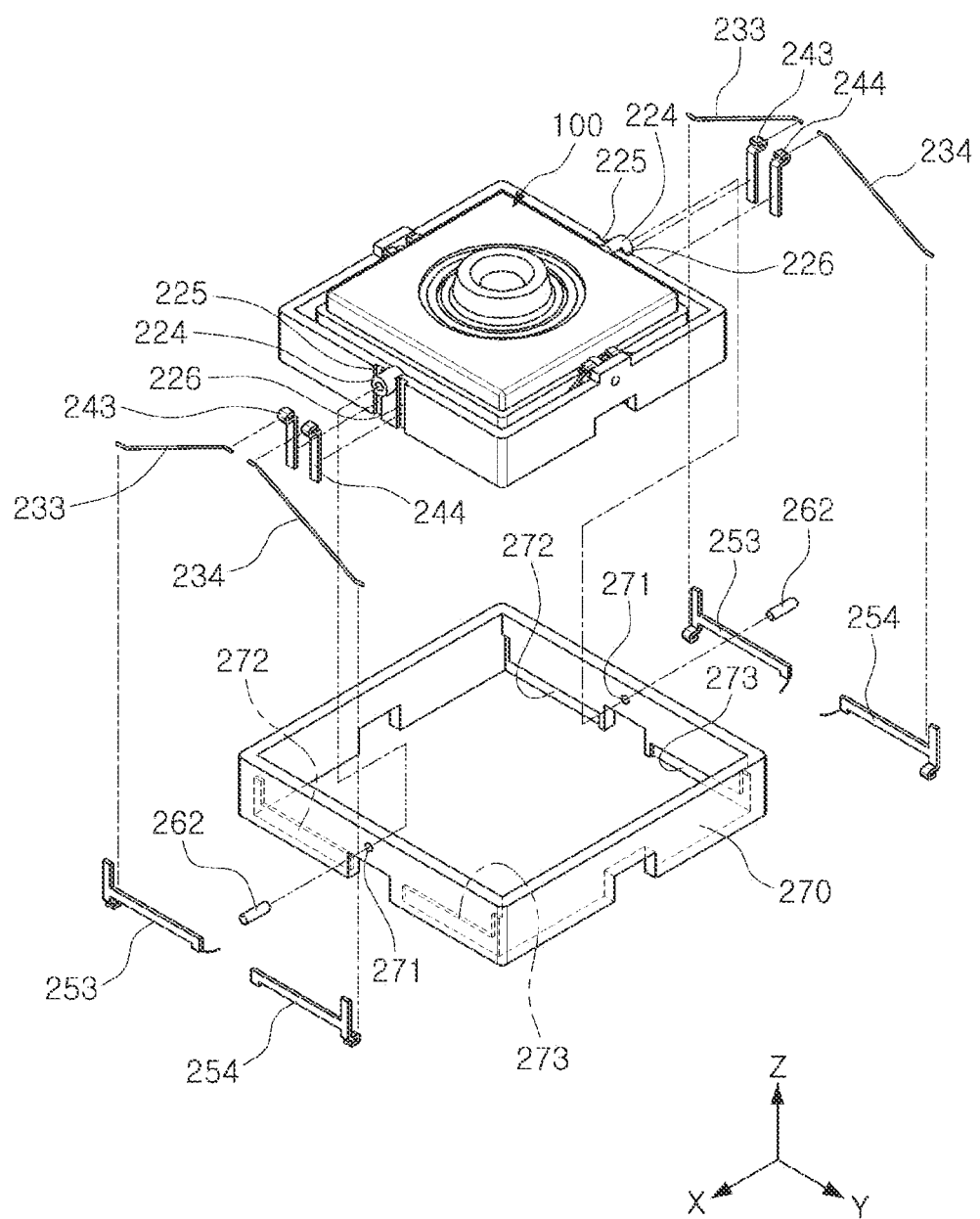
FIG. 5 is an exploded perspective view of a driving unit configured to rotate the optical module around an X-axis, according to an embodiment.
Figure 6:
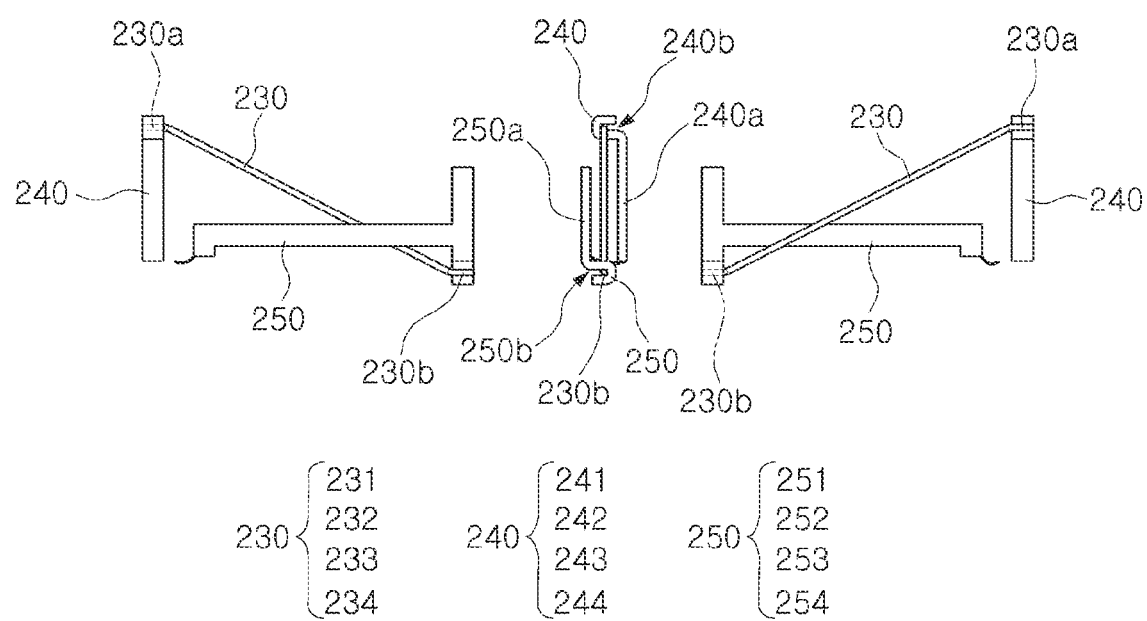
FIG. 6 illustrates an SMA wire and fixed parts connected to both ends of the SMA wire, according to an embodiment.

FIG. 4 is an exploded perspective view of the Y-driving unit, which is configured the optical module 100 with respect to the Y-axis, according to an embodiment. FIG. 5 is an exploded perspective view of the X-driving unit, which is configured to rotate the optical module 100 with respect to the X-axis, according to an embodiment. FIG. 6 illustrates an SMA wire 230 and conductive members 240 and 250 respectively connected to both ends of the SMA wire 230, according to an embodiment.

Referring to FIGS. 4 and 5, the optical module 100 may rotate based on two axes perpendicular to the optical axis. The camera module 1000 may include the first and second driving units 200 and 300 responsible for each rotational direction. FIG. 4 illustrates the first driving unit 200 configured to rotate the optical module 100 with respect to the Y-axis, and FIG. 5 illustrates the second driving unit 300 configured to rotate the optical module 100 with respect to the X-axis in an embodiment.

In this disclosure, the first driving unit 200 configured to rotate the optical module 100 with respect to an axis parallel to the Y-axis is referred to as a Y-driving unit. In addition, the second driving unit 300 configured to rotate the optical module 100 with respect to an axis parallel to the X-axis is referred to as an X-driving unit. "Y" and "X"" of the Y-driving unit and the X-driving unit are for distinguishing the first and second driving units 200 and 300 configured to rotate the optical module 100 based on two axes perpendicular to the optical axis from each other, and the scope of this disclosure is not limited to the terms referring to the driving units.

In an embodiment, the Y-driving unit may include the first frame 210 accommodating the optical module 100 and the second frame 220 accommodating the first frame 210. The optical module 100 is fixedly coupled to the first frame 210 and moves together with the first frame 210. In another embodiment, the optical module 100 and the first frame 210 may be integrally formed.

In an embodiment, the optical module 100 may be attached to the second frame 220 through the first frame 210 so as to rotate with respect to an axis perpendicular to the optical axis. In an embodiment, the first frame 210 may be rotatably coupled to the second frame 220. In an embodiment, the first frame 210 and the second frame 220 may be rotatably connected to each other by a pin 261 extending in a direction parallel to the Y-axis. The first frame 210 and the second frame 220 may have holes 211 and 221 accommodating the pins 261, respectively. In the illustrated embodiment, the pins 261 and the holes 211 and 221 may be symmetrically provided in a +Y direction and a −Y direction of the optical module 100, respectively.

In an embodiment, the first frame 210 and the second frame 220 may have a rectangular ring shape. However, the shapes of the first and second frames 210 and 220 are not limited to a rectangular ring shape, and, in other embodiments, the first and second frames 210 and 220 may have various shapes. For example, the first and second frames 210 and 220 may have a circular ring shape.

In an embodiment, a force for rotating the first frame 210 with respect to the second frame 220 may be provided by the first and second SMA wires 231 and 232. That is, the Y driving unit may include the SMA wires 231 and 232 as actuators.

In an embodiment, one end of each of the first and second SMA wires 231 and 232 may be fixed to the first frame 210 (or the optical module 100) and the other end of each of the first and second SMA wires 231 and 232 may be fixed to the second frame 220. The first and second SMA wires 231 and 232 may cause rotational movement to the first frame 210 according to a change in the length of the first and second SMA wires 231 and 232. The first frame 210 (or the optical module 100) may rotate with respect to the second frame 220 according to a change in length of the first and second SMA wires 231 and 232.

In an embodiment, the first and second SMA wires 231 and 232 may be provided on both sides with respect to a rotation axis (or the pin 261) of the first frame 210. The lengths of the first SMA wire 231 and the second SMA wire 232 may be changed in opposite directions. For example, when the length of the first SMA wire 231 increases, the length of the second SMA wire 232 may decrease, and when the length of the first SMA wire 231 decreases, the length of the second SMA wire 232 may increase.

In an embodiment, the first SMA wire 231 and the second SMA wire 232 may be disposed symmetrically to the left and right of the rotation axis. In an embodiment, the first SMA wire 231 and the second SMA wire 232 may each be provided near the rotation axis of the first frame 210 and may extend in different directions. For example, the first SMA wire 231 may extend in a −X direction, and the second SMA wire 232 may extend in a +X direction.

In an embodiment, the first and second SMA wires 231 and 232 may be coupled to the first frame 210 and the second frame 220 through conductive members 241, 242, 251, and 252. In an embodiment, one end of the first SMA wire 231 may be coupled to the first conductive member 241, and the other end of the first SMA wire 231 may be coupled to the second conductive member 251. The first conductive member 241 and the second conductive member 251 may be fixedly coupled to the first frame 210 and the second frame 220, respectively. In an embodiment, one end of the second SMA wire 232 may be coupled to the third conductive member 242, and the other end of the second SMA wire 232 may be coupled to the fourth conductive member 252. The third conductive member 242 and the fourth conductive member 252 may be fixedly coupled to the first frame 210 and the second frame 220, respectively.

In an embodiment, the first frame 210 may include seating portions 212 and 213 for the first conductive member 241 and the third conductive member 242 in portions facing the second frame 220. In an embodiment, the second frame 220 may include seating portions 222 and 223 for the second conductive member 251 and the fourth conductive member 252 in portions facing the first frame 210.

In an embodiment, the first and second SMA wires 231 and 232 may extend in a direction parallel to the X-axis and be inclined with respect to the X-axis. For example, the first SMA wire 231 may extend from the one end coupled to the first frame 210 (or the first conductive member 241) to the other end coupled to the second frame 220 (or the second conductive member 251) rightward/downward (i.e., −X/−Z direction). The second SMA wire 232 may extend from the one end coupled to the first frame 210 (or the third conductive member 242) to the other end coupled to the second frame 220 (or the fourth conductive member 252) leftward/downward (i.e., +X/−Z direction).

In an embodiment, as the length of one of the first SMA wire 231 and the second SMA wire 232 is increased and the length of the other of the first SMA wire 231 and the second SMA wire 232 is decreased, the optical module 100 may be rotated. For example, when the length of the first SMA wire 231 is decreased, the length of the second SMA wire 232 may be increased, which may cause the first frame 210 to be rotated in a clockwise direction around the Y-axis with respect to the second frame 220. This rotation may take place in a state in which a voltage is applied between the first conductive member 241 and the second conductive member 251 and no voltage is applied between the third conductive member 242 and the fourth conductive member 252.

As another example, when the length of the first SMA wire 231 is increased, the length of the second SMA wire 232 may be decreased, which may cause the first frame 210 to be rotated in a counterclockwise direction around the Y-axis with respect to the second frame 220. This rotation may take place in a state in which a voltage is applied between the third conductive member 242 and the fourth conductive member 252 and no voltage is applied between the first conductive member 241 and the second conductive member 251.

In an embodiment, the Y-driving unit provided on one side of the optical module 100 to rotate the first frame 210 with respect to the second frame 220 may also be provided on the other side of the optical module 100 with respect to the optical axis. That is, the pins 261, the first and second SMA wires 231 and 232, and the conductive members 241, 242, 251, and 252 may be provided symmetrically based on an X-Z plane. Since the Y-driving unit is provided on both sides of the optical module 100, a driving force for driving the optical module 100 may be sufficiently secured.

In another embodiment, the Y-driving unit may be provided on only one side of the optical module 100. For example, the first SMA wire 231 and the second SMA wire 232 may be provided on only one side of the optical module 100.

In an embodiment, the X driving unit may include the second frame 220 accommodating the optical module 100 and a third frame 270 accommodating the second frame 220.

In an embodiment, the optical module 100 may be attached to the third frame 270 through the second frame 220 so as to rotate with respect to an axis perpendicular to the optical axis. In an embodiment, the second frame 220 may be rotatably coupled to the third frame 270. In an embodiment, the second frame 220 and the third frame 270 may be rotatably connected to each other by the pins 262 extending in a direction parallel to the X-axis. The second frame 220 and the third frame 270 may have holes 224 and 271 accommodating the pins 262, respectively. In the illustrated embodiment, the pins 262 and the holes 224 and 271 may be symmetrically provided in the +X direction and the −X direction of the optical module 100, respectively.

In an embodiment, the second frame 220 and the third frame 270 may have a rectangular ring shape. However, the shapes of the second and third frames 220 and 270 are not limited to a rectangular ring shape, and in other embodiments, the second and third frames 220 and 270 may have various shapes. For example, the second and third frames 220 and 270 may have a circular ring shape.

In an embodiment, third and fourth SMA wires 233 and 234 may provide a force to rotate the second frame 220 with respect to the third frame 270. That is, the X-driving unit may include the third and fourth SMA wires 233 and 234 as actuators.

In an embodiment, one end of each of the third and fourth SMA wires 233 and 234 may be fixedly coupled to the second frame 220 (or the optical module 100), and the other end of each of the third and fourth SMA wires 233 and 234 may be fixedly coupled to the third frame 270. The third and fourth SMA wires 233 and 234 may provide a rotational moment to the second frame 220 according to a change in length of the third and fourth SMA wires 233 and 234. The second frame 220 (or the optical module 100) may rotate with respect to the third frame 270 according to a change in length of the third and fourth SMA wires 233 and 234.

In an embodiment, the third and fourth SMA wires 233 and 234 may be provided on both sides with respect to the rotation axis of the second frame 220. The third SMA wire 233 and the fourth SMA wire 234 may change in length in opposite directions. For example, when the length of the third SMA wire 233 is increased, the length of the fourth SMA wire 234 may be decreased, and when the length of the third SMA wire 233 is decreased, the length of the fourth SMA wire 234 may be increased.

In an embodiment, the third SMA wire 233 and the fourth SMA wire 234 may be disposed symmetrically to the left and right of the rotation axis. In an embodiment, the third SMA wire 233 and the fourth SMA wire 234 may each be disposed near the rotation axis of the second frame 220 and may extend in different directions. For example, the third SMA wire 233 may extend in the −Y direction, and the fourth SMA wire 234 may extend in the +Y direction.

In an embodiment, the SMA wires 233 and 234 may be coupled to the second frame 220 and the third frame 270 through the conductive members 243, 244, 253, and 254. In an embodiment, one end of the third SMA wire 233 may be coupled to the fifth conductive member 243, and the other end of the third SMA wire 233 may be coupled to the sixth conductive member 253. The fifth conductive member 243 and the sixth conductive member 253 may be fixedly coupled to the second frame 220 and the third frame 270, respectively. In an embodiment, one end of the fourth SMA wire 234 may be coupled to the seventh conductive member 244, and the other end the fourth SMA wire 234 may be coupled to the eighth conductive member 254. The seventh conductive member 244 and the eighth conductive member 254 may be fixedly coupled to the second frame 220 and the third frame 270, respectively.

In an embodiment, the second frame 220 may include seating portions 225 and 226 for the fifth conductive member 243 and the seventh conductive member 244 in portions of the second frame 220 facing the third frame 270. In an embodiment, the third frame 270 may include seating portions 272 and 273 for the sixth conductive member 253 and the eighth conductive member 254 in portions of the third frame 270 facing the second frame 220.

In an embodiment, the third and fourth SMA wires 233 and 234 may extend in a direction substantially parallel to the Y-axis and be inclined with respect to the Y-axis. For example, the third SMA wire 233 may extend from the one end coupled to the second frame 220 (or the fifth conductive member 243) to the other end coupled to the third frame 270 (or the sixth conductive member 253) leftward/downward (i.e., −Y/−Z direction). The fourth SMA wire 234 may extend from the one end coupled to the second frame 220 (or the seventh conductive member 244) to the other end coupled to the third frame 270 (or the eighth conductive member 254) rightward/downward (i.e., +Y/−Z direction).

In an embodiment, the optical module 100 may rotate as the length of one of the third SMA wire 233 and the fourth SMA wire 234 is increased and the length of the other one of the third SMA wire 233 and the fourth SMA wire 234 is decreased. For example, when the length of the third SMA wire 233 is decreased, the length of the fourth SMA wire 234 may be increased, which causes the second frame 220 to rotate around the X-axis with respect to the third frame 270 in a clockwise direction. This rotation may take place in a state in which a voltage is applied between the fifth conductive member 243 and the sixth conductive member 253 and no voltage is applied between the seventh conductive member 244 and the eighth conductive member 254.

As another example, when the length of the third SMA wire 233 is increased, the length of the fourth SMA wire 234 may be decreased, causing the second frame 220 to rotate around the X-axis with respect to the third frame 270 X in a counterclockwise direction. This rotation may take place in a state in which a voltage is applied between the seventh conductive member 244 and the eighth conductive member 254 and no voltage is applied between the fifth conductive member 243 and the sixth conductive member 253.

In an embodiment, the X-driving unit provided on one side of the optical module 100 to rotate the second frame 220 with respect to the third frame 270 may also be provided on the other side of the optical module 100 with respect to the optical axis. That is, the pins 262, the SMA wires 233 and 234, and the conductive members 243, 244, 253, and 254 may be disposed symmetrically with respect to a Y-Z plane. Since the X-driving unit is provided on both sides of the optical module 100, a driving force for driving the optical module 100 may be sufficiently secured.

In another embodiment, the X-driving unit may be provided on only one side of the optical module 100. For example, the third SMA wire 233 and the fourth SMA wire 234 may be provided on only one side of the optical module 100.

In this disclosure, the conductive members 241, 242, 243, 244, 251, 252, 253, and 254 connected to both ends of the first to fourth SMA wires 231 to 234 may be divided into moving side conductive members 240 including the conductive members 241, 242, 243, 244 and fixed side conductive members 250 including the conductive members 251, 252, 253, and 254. Since the first frame 210 rotates with respect to the second frame 220, the first conductive member 241 and the third conductive member 242, which are disposed outside the first frame 210, may be defined as moving side conductive members 240 and the second conductive member 251 and the fourth conductive member 252 provided inside the second frame 220 may be defined as fixed side conductive members 250.

Since the second frame 220 rotates with respect to the third frame, the fifth conductive member 243 and the seventh conductive member 244, which are provided outside the second frame 220, may be defined as moving side conductive members 240 and the sixth conductive member 253 and the eighth conductive member 254, which are provided inside the third frame, may be defined as the fixed side conductive members 250.

Referring to FIG. 6, the first to fourth SMA wires 231 to 234 are collectively represented by an SMA wire 230.

Referring to FIG. 6, both the moving side conductive members 240 and the fixed side conductive members 250 may include curved portions 240b and 250b, respectively. Bases 240a and 250a may be attached to the frames 210, 220, and 270, and both ends 230a and 230b of the SMA wire 230 may be coupled to the curved portions 240b and 250b.

Figure 7:
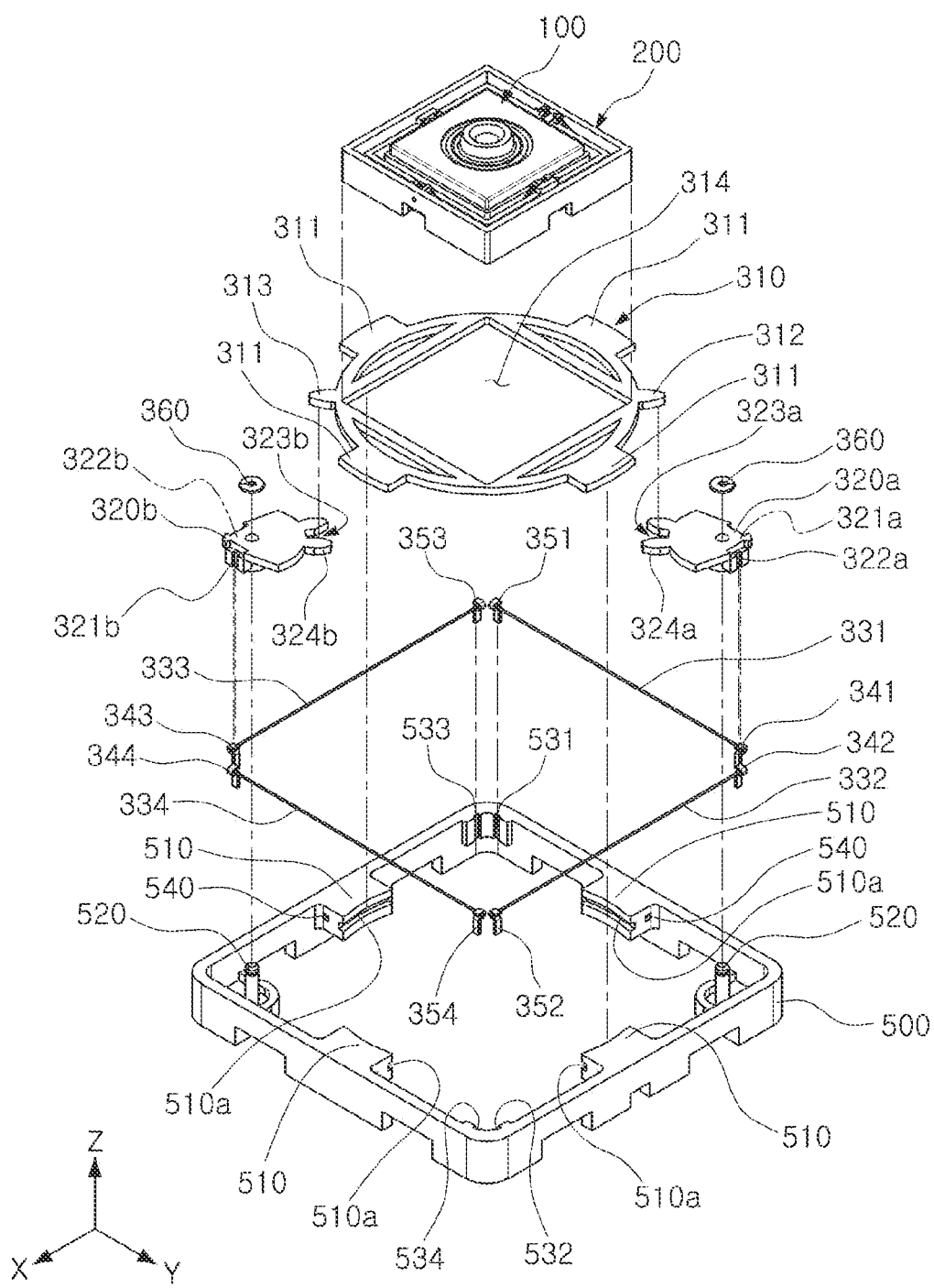
FIG. 7 is an exploded perspective view of a driving unit configured to rotate the optical module around an optical axis, according to an embodiment.

FIG. 7 is an exploded perspective view of the second driving unit 300 for rotating the optical module 100 based on the optical axis, according to an embodiment.

Referring to FIG. 7, the optical module 100 may be disposed on a rotating plate 310. The rotating plate 310 may have a substantially ring shape and may include an assembly in which the optical module 100 and the first driving unit 200 are coupled to a central through-portion 314.

In an embodiment, the rotating plate 310 may be rotatable with respect to the optical axis in the housing 500. In an embodiment, the rotating plate 310 may include an extension 311 extending in a radial direction on an outer circumferential surface of the plate 310. The housing 500 may include a guide groove 510a accommodating at least a portion of the extension 311 of the rotating plate 310.

In an embodiment, the rotating plate 310 includes four extensions 311, and the housing 500 includes four guide grooves 510a respectively corresponding to the four extensions 311. For example, the housing 500 may have a square ring shape including four protrusions 510 extending inward from four sides, and the four protrusions 510 may have guide grooves 510a at ends thereof, respectively.

In an embodiment, an outer circumferential surface of the extension 311 of the rotating plate 310 may have a curvature with respect to the optical axis, and surfaces defining the guide grooves 510a may also have a curvature with respect to the optical axis. When the extension 311 of the rotating plate 310 is fitted into the guide groove 510a of the housing 500, the rotating plate 310 may rotate about the optical axis, with respect to the housing 500.

In an embodiment, the second driving unit 300 may include fifth, sixth, seventh, and eighth SMA wires 331, 332, 333, and 334 as actuators for rotating the rotating plate 310 with respect to the housing 500. In an embodiment, one end of each of the fifth, sixth, seventh, and eighth SMA wires 331, 332, 333, and 334 may be coupled to interlock with the rotating plate 310, and the other end of each of the fifth, sixth, seventh, and eighth thereof may be fixedly coupled to the housing 500. As the lengths of the fifth, sixth, seventh, and eighth SMA wires 331, 332, 333, and 334 change, the rotating plate 310 may rotate in a clockwise or counterclockwise direction with respect to the housing 500.

In an embodiment, the one end of each of the fifth, sixth, seventh, and eighth the SMA wires 331, 332, 333, and 334 may be coupled to rotary arms 320a and 320b interlocking with the rotary plate 310. In an embodiment, the rotary arms 320a and 320b may be fitted into protruding pins 520 provided inside the housing 500 to rotate with respect to the housing 500. The protruding pin 520 may extend in a direction parallel to the Z-axis, and the rotary arms 320a and 320b may rotate around the protruding pins 520. After the rotary arms 320a and 320b are inserted into the protruding pins 520, washers 360 may be coupled to the ends of the protruding pins 520. The washers 360 may prevent the rotary arms 320a and 320b from escaping from the protruding pins 520.

In an embodiment, the rotary arms 320a and 320b may rotate according to a change in the length of the fifth, sixth, seventh, and eighth SMA wires 331, 332, 333, and 334. In a state in which the one end and the other end of each of the fifth, sixth, seventh, and eighth SMA wires 331, 332, 333, and 334 are fixed to the rotary arms 320a and 320b and the housing 500, respectively, when a length of any one of the fifth, sixth, seventh, and eighth SMA wires 331, 332, 333, and 334 is shortened, the corresponding SMA wire may pull one point of the rotary arms 320a and 320b in a length direction of the SMA wire to rotate the rotary arms 320a and 320b around the protruding pins 520.

In an embodiment, the rotary arms 320a and 320b may include accommodating portions 323a and 323b accommodating a portion of the rotary plate 310 at one end. In an embodiment, the rotating plate 310 may include a radially extending protrusion 313, and the rotary arms 320a and 320b may include accommodating portions 323a and 323b configured to accommodate a portion of the protrusion 313. When the rotary arms 320a and 320b rotate in a state in which the protrusion 313 is fitted into the accommodating portions 323a and 323b, the rotating plate 310 may rotate.

In an embodiment, the rotary plate 310 and the rotary arms 320a and 320b may interlock with each other via meshing engagement. In an embodiment, the rotary plate 310 and the rotary arms 320a and 320b may be engaged by gear coupling. That is, the protrusion 313 of the rotating plate 310 may include a gear portion including at least one gear tooth. In addition, the rotary arms 320a and 320b may include a gear portion engaged with the gear portion of the rotating plate 310. In this case, the accommodating portions 323a and 323b of the rotary arms 320a and 320b may be defined as a space between two or more gear teeth constituting the gear portion. For example, the protrusion 313 may have a single gear tooth shape, and the accommodating portions 323a and 323b of the rotary arms 320a and 320b may be defined as a space between two gear teeth 324a and 324b in contact with the protrusion 313.

In the illustrated embodiment, the protrusion 313 of the rotating plate 310 includes one gear tooth and the accommodating portions 323a and 323b of the rotary arms 320a and 320b include two gear teeth, but this is only an example. In another embodiment, the protrusion 313 of the rotating plate 310 may include two gear teeth and the rotary arms 320a and 320b may include three gear teeth engaged with the gear teeth of the protrusion 313.

In an embodiment, two SMA wires may be connected to each of the rotary arms 320a and 320b. The two SMA wires may extend from the rotary arms 320a and 320b in different directions so as to be connected to the housing 500. For example, the fifth and sixth SMA wires 331 and 332 may be connected to the rotary arm 320a, such that the lengths of the fifth and sixth SMA wires 331 and 332 may be changed in mutually opposite directions. For example, when the length of the fifth SMA wire 331 is decreased, the length of the sixth SMA wire 332 may be increased, and when the length of the sixth SMA wire 332 is decreased, the length of the fifth SMA wire 331 may be increased.

In an embodiment, the second driving unit 300 may be disposed symmetrically with respect to the optical axis. In an embodiment, the two rotary arms 320a and 320b may be provided at two opposite corners of the housing 500, respectively, and two SMA wires may be provided in the rotary arms 320a and 320b, respectively. When the second driving unit 300 is provided in two locations, the number of SMA wires rotating the optical module 100 may increase, and thus, a driving force necessary for rotating the optical module 100 may be sufficiently secured.

In an embodiment, one end of the fifth SMA wire 331 may be fixed to the first rotary arm 320a and may extend in the −Y direction along one side wall of the housing 500. The one end of the fifth SMA wire 331 may be located at one corner of the housing 500 and the other end of the fifth SMA wire 331 may be located at a neighboring corner.

One end of the sixth SMA wire 332 may be fixed to the first rotary arm 320a and may extend in the +X direction. The one end of the sixth SMA wire 332 may be located at one corner of the housing 500, and the other end of the sixth SMA wire 332 may be located at a neighboring corner.

The length of one of the fifth SMA wire 331 and the sixth SMA wire 332 is increased and length of the other one of the fifth SMA wire 331 and the sixth SMA wire 332 is decreased, whereby the first rotary arm 320a may rotate in a clockwise or counterclockwise direction. For example, when the length of the fifth SMA wire 331 is decreased and the length of the sixth SMA wire 332 is increased, the first rotary arm 320a may rotate in the counterclockwise direction. As another example, when the length of the fifth SMA wire 331 is increased and the length of the sixth SMA wire 332 is decreased, the first rotary arm 320a may rotate in the clockwise direction.

In an embodiment, one end of the seventh SMA wire 333 may be fixed to the second rotary arm 320b and may extend in the −X direction. One end of the eighth SMA wire 334 may be fixed to the second rotary arm 320b and may extend in the +Y direction. The length of one of the seventh SMA wire 333 and the eighth SMA wire 334 is increased and the length of the other one of the seventh SMA wire 333 and the eighth SMA wire 334 is decreased, so that the second rotary arm 320b may rotate in the clockwise or counterclockwise direction. For example, when the length of the seventh SMA wire 333 is decreased and the length of the eighth SMA wire 334 is increased, the second rotary arm 320b may rotate in the clockwise direction. As another example, when the length of the seventh SMA wire 333 is increased and the length of the eighth SMA wire 334 is decreased, the second rotary arm 320b may rotate in the counterclockwise direction.

In an embodiment, the second driving unit 300 may be configured such that the fifth SMA wire 331, the sixth SMA wire 332, the seventh SMA wire 333, and the eighth SMA wire 334 to interlock with each other. In order for the rotating plate 310 to rotate in the clockwise direction, the first rotary arm 320a and the second rotary arm 320b have to rotate in the counterclockwise direction. Accordingly, the lengths of the fifth SMA wire 331 and the eighth SMA wire 334 need to be decreased and the lengths of the sixth SMA wire 332 and the seventh SMA wire 333 need to be increased. As a voltage is applied to the fifth SMA wire 331 and the eighth SMA wire 334, the rotating plate 310 may rotate in the clockwise direction with respect to the housing 500.

Conversely, in order for the rotating plate 310 to rotate in the counterclockwise direction, the first rotary arm 320a and the second rotary arm 320b have to rotate in the clockwise direction. Therefore, the lengths of the sixth SMA wire 332 and the seventh SMA wire 333 need to be decreased and the lengths of the fifth SMA wire 331 and the eighth SMA wire 334 need to be increased. As a voltage is applied to the sixth SMA wire 332 and the seventh SMA wire 333, the rotating plate 310 may rotate in the counterclockwise direction with respect to the housing 500.

In another embodiment, the second driving unit 300 may be provided on only one side. For example, unlike the illustrated embodiment, the second rotary arm 320b, the seventh SMA wire 333 and the eighth SMA wire 334 may be omitted.

In an embodiment, the SMA wires 331, 332, 333, and 334 may be coupled to the rotary arms 320a and 320b and the housing 500 through conductive members 341, 342, 343, 344, 351, 352, 353, and 354. In an embodiment, one end of the fifth SMA wire 331 may be coupled to a ninth conductive member 341, and the other end of the fifth SMA wire 331 may be coupled to a tenth conductive member 351. The ninth conductive member 341 and the tenth conductive member 351 may be fixedly coupled to the first rotary arm 320a and the housing 500, respectively.

In an embodiment, one end of the sixth SMA wire 332 may be coupled to an eleventh conductive member 342, and the other end of the sixth SMA wire 332 may be coupled to a twelfth conductive member 352. The eleventh conductive member 342 and the twelfth conductive member 352 may be fixedly coupled to the first rotary arm 320a and the housing 500, respectively.

In an embodiment, one end of the seventh SMA wire 333 may be coupled to a thirteenth conductive member 343, and the other end of the seventh SMA wire 333 may be coupled to a fourteenth conductive member 353. The thirteenth conductive member 343 and the fourteenth conductive member 353 may be fixedly coupled to the second rotary arm 320b and the housing 500, respectively.

In an embodiment, one end of the eighth SMA wire 334 may be coupled to the fifteenth conductive member 344, and the other end of the eighth SMA wire 334 may be coupled to a sixteenth conductive member 354. The fifteenth conductive member 344 and the sixteenth conductive member 354 may be fixedly coupled to the second rotary arm 320b and the housing 500, respectively.

In an embodiment, the rotary arms 320a and 320b may include seating portions 321a, 322a, 321b, and 322b for the ninth conductive member 341, the eleventh conductive member 342, the thirteenth conductive member 343, and the fifteenth conductive member 344, respectively. In an embodiment, the housing 500 may include seating portions 531, 532, 533, and 534 for the tenth conductive member 351, the twelfth conductive member 352, the fourteenth conductive member 353, and the sixteenth conductive member 354, respectively.

In the illustrated embodiment, the fifth, sixth, seventh, and eighth SMA wires 331, 332, 333, and 334 may interlock with the rotary plate 310 through the rotary arms 320a and 320b, and, in another embodiment, one end of each of the fifth, sixth, seventh, and eighth SMA wires 331, 332, 333, and 334 may be directly coupled to the rotating plate 310.

That is, the fifth, sixth, seventh, and eighth SMA wires 331, 332, 333, and 334 may directly pull the rotating plate 310 to rotate the rotating plate 310 with respect to the housing 500.

In an embodiment, the protrusion 510 for guiding rotation of the rotating plate 310 may be provided so as not to interfere with the fifth, sixth, seventh, and eighth SMA wires 331, 332, 333, and 334. In an embodiment, the protrusion 510 may include a through portion 540 through which the SMA wires 331, 332, 333, and 334 may pass.

Figure 8:
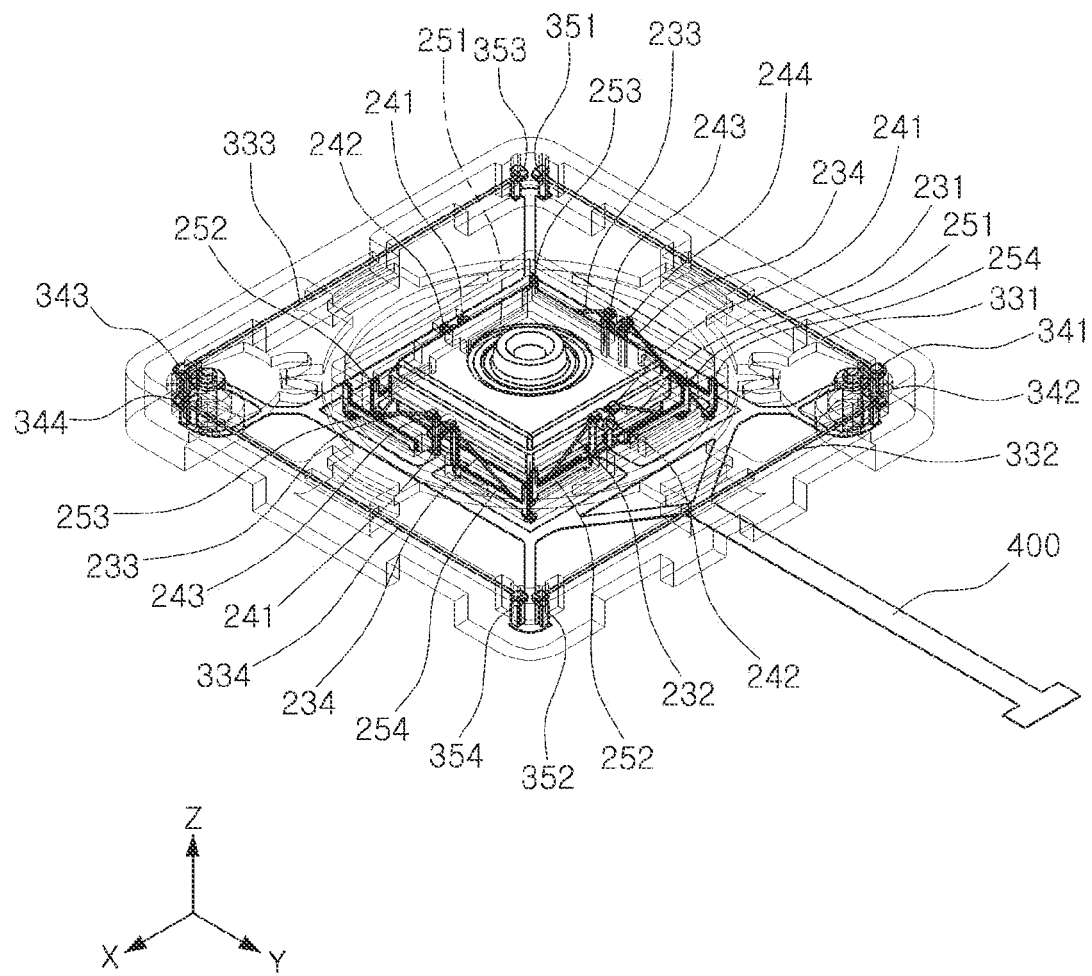
FIG. 8 illustrates an electrical wiring configured to transfer a signal to a driving unit, according to an embodiment.
Figure 9:
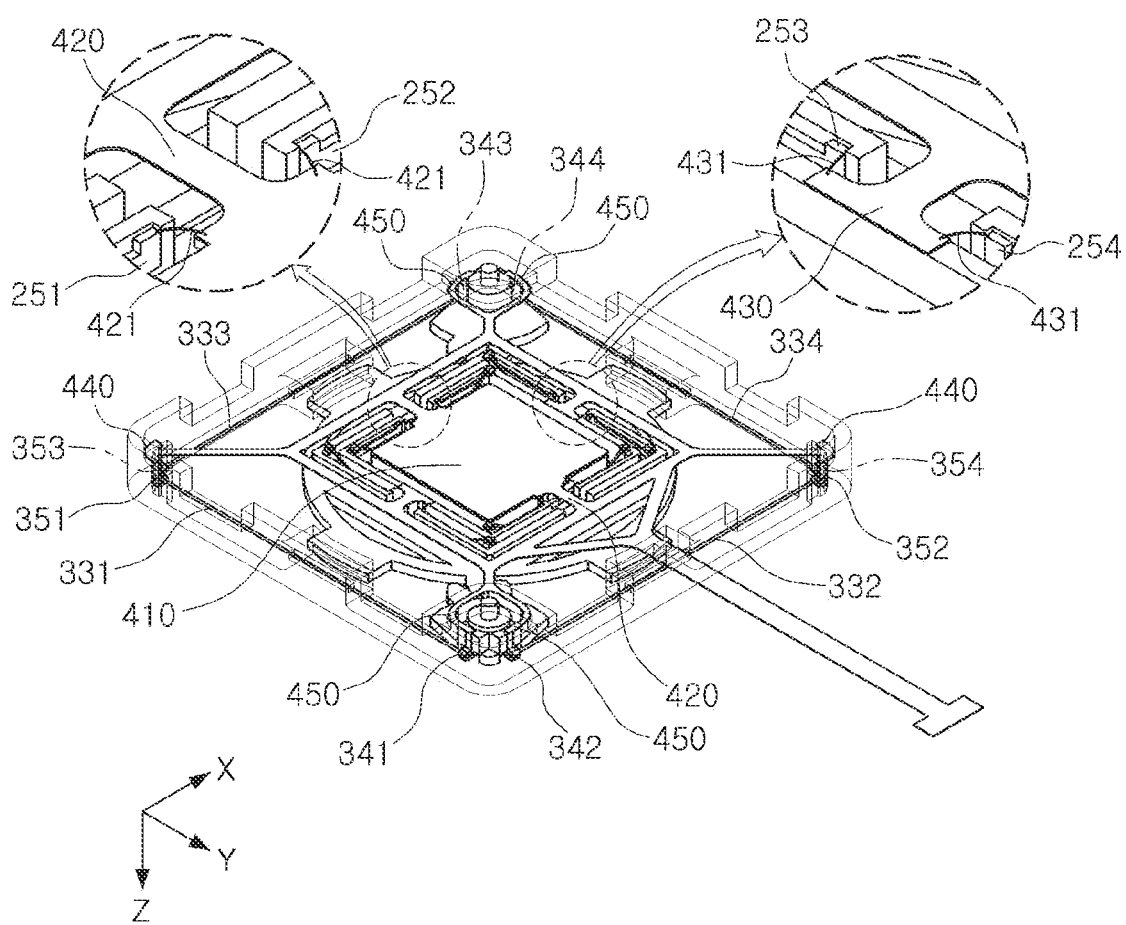
FIG. 9 illustrates the electrical wiring of FIG. 8 as viewed from a rear surface of the optical module.

FIG. 8 shows an electrical wiring for transmitting a signal to the first (Y-driving) and second driving units 200 and 300, according to an embodiment. FIG. 9 is a rear view of the electrical wiring of FIG. 8.

In an embodiment, the camera module 1000 may include an electrical wiring for applying a voltage to the first to eighth SMA wires 231, 232, 233, 234, 331, 332, 333, and 334. Electrical wiring may be disposed on the substrate 400. The substrate 400 may include the electrical wiring as a path for a signal output from the image sensor.

In an embodiment, the Y-driving unit includes the first SMA wire 231 and the second SMA wire 232 to rotate the optical module 100 about the Y-axis. Both ends of the first SMA wire 231 and the second SMA wire 232 may be respectively connected to conductive members, and the substrate 400 may be provided to apply a voltage between the conductive members. For example, the first SMA wire 231 may be connected to the first conductive member 241 and the second conductive member 251, and the substrate 400 may be electrically connected to the first conductive member 241 and the second conductive member 251 and apply a voltage between the two conductive members 241 and 251. As another example, the second SMA wire 232 may be connected to the third conductive member 242 and the fourth conductive member 252, and the substrate 400 may be electrically connected to the third conductive member 242 and the fourth conductive member 252 and may apply a voltage between the two conductive members 242 and 252.

In an embodiment, the X-driving unit includes the third SMA wire 233 and the fourth SMA wire 234 to rotate the optical module 100 about the X-axis. Both ends of the third SMA wire 233 and the fourth SMA wire 234 may be respectively connected to conductive members and apply a voltage to the conductive members. For example, the third SMA wire 233 may be connected to the fifth conductive member 243 and the sixth conductive member 253, and the substrate 400 may be electrically connected to the fifth conductive member 243 and the sixth conductive member 253 and apply a voltage between the two conductive members 243 and 253. As another example, the fourth SMA wire 234 may be connected to the seventh conductive member 244 and the eighth conductive member 254, and the substrate 400 may be electrically connected to the seventh conductive member 244 and the eighth conductive member 254 and may apply a voltage between the two conductive members.

Referring to FIG. 9, the substrate 400 may include a sensor portion 410 attached to the rear surface of the optical module 100. The sensor portion 410 may include electrical wirings through which signals output from the image sensor are transmitted. The sensor portion 410 may be connected to other portions through a branch portion 420 extending in the Y-axis direction.

The sensor portion 410 may be electrically connected to the first conductive member 241 and the third conductive member 242, which are disposed in the first frame 210. Also, some wirings 421 extending from the sensor portion 410 may be connected to the second conductive member 251 and the fourth conductive member 252, which are disposed in the second frame 220.

A branch portion 430 extending from the substrate 400 in the X-axis direction may be electrically connected to the fifth conductive member 243 and the seventh conductive member 244, which are disposed in the second frame 220. Also, a partial wiring 431 extending from the branch portion 430 may be connected to the sixth conductive member 253 and the eighth conductive member 254, which are disposed in the third frame 270.

In an embodiment, the second driving unit 300 includes the fifth SMA wire 331 to the eighth SMA wire 334 to rotate the optical module 100 about the optical axis. Both ends of each of the fifth to eighth SMA wires 331 to 334 are connected to conductive members, and the substrate 400 may be configured to apply a voltage between the fifth to eighth SMA wires 331 to 334 and the conductive members.

Referring to FIG. 9, the substrate 400 may include a portion 450 extending toward the conductive members 341, 342, 343, and 344 disposed in the rotary arms 320a and 320b, and a portion 440 extending toward the conductive members 351, 352, 353, and 354 disposed in the housing. The portion 450 extending from the substrate 400 toward the rotary arms 320a and 320b may include two parts respectively connected to two conductive members 341 and 342 and two conductive members 343 and 344, respectively.

The substrate 400 shown in FIGS. 8 and 9 is merely an example, and, in other embodiments, the substrate 400 may be provided in various forms.

As set forth above, a camera module according to embodiments disclosed herein may include a driving unit free of electromagnetic interference with surrounding electronic components. In addition, a camera module according to embodiments disclosed herein may have a compact size, while providing a 3-axis gimbal function.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
a first driving unit, including:
a rotating plate disposed in a housing, and configured to rotate about an optical axis; and
a first shape memory alloy (SMA) wire configured to rotate the rotating plate in response to a first applied current;
a rotary arm rotatably disposed in the housing and interlocking with the rotating plate; and
an optical module disposed in the housing and coupled to the rotating plate,
wherein the rotating plate and the rotary arm interlock with each other by a meshing engagement.

2. The camera module of claim 1, wherein the first SMA wire has one end interlocking with the rotating plate and another end fixedly coupled to the housing, and
wherein the rotating plate is configured to rotate in either one of a clockwise direction and a counterclockwise direction about the optical axis, according to a change in length of the first SMA wire.

3. The camera module of claim 2, wherein the first driving unit further includes a second SMA wire configured to change in length, in a direction opposite to a direction of the change in length of the first SMA wire, in response to the first applied current, and having one end interlocking with the rotating plate and another end fixedly coupled to the housing.

4. The camera module of claim 2,
wherein the one end of the first SMA wire is connected to the rotary arm and the other end of the first SMA wire is connected to the housing.

5. The camera module of claim 4, wherein the rotating plate includes a protrusion extending in a radial direction, and the rotary arm and the rotating plate interlock with each other by the protrusion being accommodated in an accommodating portion disposed in the rotary arm.

6. The camera module of claim 4, wherein the housing has a quadrangular ring shape having four corners,
wherein the rotary arm is rotatably disposed in a first corner of the housing, and
wherein the one end of the first SMA wire is fixedly coupled to the rotary arm and the other end of the first SMA wire is fixedly coupled to a second corner of the housing adjacent to the first corner.

7. The camera module of claim 1, further comprising:
a substrate electrically connected to two ends of the first SMA wire such that current is allowed to flow through the first SMA wire.

8. The camera module of claim 7, wherein the first driving unit further includes a first conductive member fixedly coupled to the optical module and a second conductive member fixedly coupled to the housing,
wherein the two ends of the first SMA wire are coupled to the first conductive member and the second conductive member, and
wherein the substrate is configured to apply a voltage between the first conductive member and the second conductive member.

9. The camera module of claim 1, further comprising:
a second driving unit configured to rotate the optical module about a first axis perpendicular to the optical axis, and
wherein the second driving unit includes a third SMA wire configured to change in length in response to a second applied current.

10. The camera module of claim 9, wherein the second driving unit further includes a first frame accommodating the optical module and a second frame accommodating the first frame,
wherein one end of the third SMA wire is fixedly coupled to the first frame and another end of the third SMA wire is fixedly coupled to the second frame, and
wherein the first frame is configured to rotate about the first axis with respect to the second frame, according to a change in length of the third SMA wire.

11. The camera module of claim 10, wherein the second driving unit further includes a fourth SMA wire configured to change in length, in a direction opposite to a direction of the change in length of the third SMA wire, in response to the second applied current, and having one end fixedly coupled to the first frame and another end fixedly coupled to the second frame.

12. The camera module of claim 9, further comprising:
a third driving unit configured to rotate the optical module about a second axis perpendicular to the optical axis and intersecting the first axis, and
wherein the third driving unit includes a fifth SMA wire configured to change in length in response to a third applied current.

13. The camera module of claim 12, wherein the third driving unit further includes a second frame accommodating the optical module and a third frame accommodating the second frame,
wherein one end of the fifth SMA wire is fixedly coupled to the second frame and another end of the fifth SMA wire is fixedly coupled to the third frame, and
wherein the second frame is configured to rotate about the second axis with respect to the third frame, according to a change in length of the fifth SMA wire.

14. The camera module of claim 13, wherein the third driving unit further includes a sixth SMA wire configured to change in length, in a direction opposite to a direction of the change in length of the fifth SMA wire, in response to the third applied current, and having one end fixedly coupled to the second frame and another end fixedly coupled to the third frame.

15. A camera module, comprising:
an optical module disposed in a housing; and
a driving unit configured to rotate the optical module about an optical axis and an axis perpendicular to the optical axis,
wherein the driving unit includes an actuator including at least one shape memory alloy (SMA) wire configured to change in length in response to applied current,
wherein the at least one SMA wire comprises two SMA wires configured change in length in response to the applied current to cause the optical module to rotate about the axis perpendicular to the optical axis, and
wherein one of the two SMA wires is configured to shorten when the other of the two SMA wires lengthens.

16. The camera module of claim 15, wherein each of the two SMA wires has one end connected to a first frame to which the optical module is rotatably mounted, and another end connected to a second frame to which the first frame is rotatably mounted.

17. The camera module of claim 16, wherein the one end of each of the two SMA wires is connected to the first frame through one conductive member configured to receive the applied current, and the other end of each of the SMA wires is connected to the second frame through another conductive member configured to receive the applied current.

18. The camera module of claim 15, wherein the at least one SMA wire comprises two SMA wires configured change in length in response to the applied current to cause the optical module to rotate about the optical axis, and
wherein one of the two SMA wires is configured to shorten when the other of the two SMA wires lengthens.

19. The camera module of claim 18, wherein each of the two SMA wire has one end connected to the housing, and another end connected to a plate rotatably supporting the optical module.

20. The camera module of claim 19, wherein the one end of each of the two SMA wires is connected to the housing through one conductive member configured to receive the applied current, and the other end of each of the SMA wires is connected to the plate through another conductive member configured to receive the applied current.

* * * * *